Oct. 13, 1959         L. CRANBERG         2,908,822

APPARATUS FOR MEASURING TOTAL NEUTRON CROSS SECTIONS

Filed Feb. 4, 1957

WITNESSES:

INVENTOR.
Lawrence Cranberg
BY

United States Patent Office 2,908,822
Patented Oct. 13, 1959

2,908,822

APPARATUS FOR MEASURING TOTAL NEUTRON CROSS SECTIONS

Lawrence Cranberg, Los Alamos, N. Mex., assignor to the United States of America as represented by the United States Atomic Energy Commission Application February 4, 1957, Serial No. 638,185

3 Claims. (Cl. 250—83.3)

This invention relates to apparatus utilized in combination with particle accelerators for analyzing the nuclear reaction products resulting from impingement of particles against a selected target material. More particularly it relates to a method and apparatus for selecting nuclear events occurring within a selected energy band of interest and simultaneously selecting and identifying individual neutron energies more precisely within the selected energy band; and for recording the number of neutrons for each energy in the appropriate channel of a multi-channel pulse height analyzer.

Utilization of materials in nuclear devices such as reactors requires that the behavior, in other words the cross section of each active material, be definitely established and known.

In addition, the characteristics of behavior of scattering materials also needs to be known. The information desirably to be ascertained are the energy of neutrons after being scattered by passage into a scattering medium and the relative number, direction and energy of such scattered neutrons.

It is, accordingly, a primary objective of the present invention to provide apparatus for ascertaining the behavior of substances under charged particle or neutron bombardment with facility and accuracy.

Other objectives and their manner of accomplishment will become apparent as the description proceeds.

The system of the present invention is briefly as follows. The particle beam created in a particle accelerator is deflected to and fro across a target containing a reactive material of interest. This then results in the target being pulsed with impinging particles for a known definite short duration. A detector spaced a measured distance from the target is used to detect the neutrons produced. The transit time from target to detector is measured by a time-to-voltage converter which is coupled to the detector and which generates an output pulse having an amplitude corresponding to the respective time of flight of each neutron. An adjustable single channel analyzer is coupled to the converter so that pulse heights, i.e., neutrons of energy in a narrow band of interest, are selected. The single channel analyzer generates an output pulse for each accepted time of flight pulse to gate-on a multi-channel analyzer.

The potential of the nuclear target is modulated with a symmetrical high voltage sweep at a rate much slower than the deflection rate. A hereinafter termed function sampler is coupled to both the detector and the modulation oscillator to generate a pulse, in response to each detector output, which has an amplitude proportional to the instantaneous target potential at the time the respective reaction product was generated. The output of the function sampler is coupled thru the aforementioned gate to the input of the multi-channel analyzer. The gate is opened by gating signals from the single channel analyzer so that particles having energies falling within the desired energy band are admitted, sorted more precisely within the band, and counted by the multi-channel analyzer.

This invention will be more fully understood as the description proceeds with reference to the drawing made a part of the specification.

Figure 1:
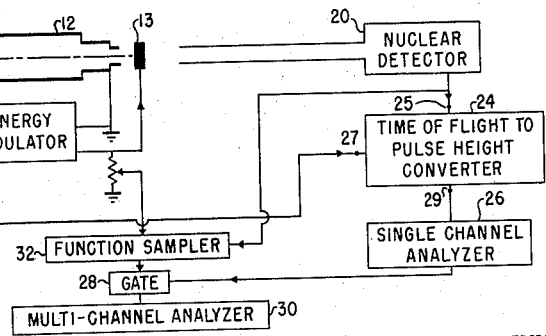
Figure 1 is a block diagram of the system of this invention.

Referring to Figure 1, target 13 contains the nuclear substance of interest and is positioned in the path 15 of a high velocity particle beam. The target is varied in voltage symmetrically above and below ground by energy modulation oscillator 14. At the same time, the particle beam is swept at a much faster rate to and fro across the particle duct 19 by deflector plates 16 which are energized by deflection oscillator 18. The particle beam is intercepted by the walls of the particle duct except when the beam is directed along the axis of the duct and therefore this provides a pulsed beam of particles impinging on target 13.

Types of target material, reaction products and nuclear reaction detectors are well-known devices in the art and are fully described in the National Nuclear Energy Series, V-3, pages 55–161, by Graves and Froman, published by McGraw-Hill Book Company, Inc., New York, 1952, the subject matter of which is herein incorporated by reference.

A nuclear reaction detector 20 is positioned in the path of the reaction products from target 13. The reaction products from the target have various energies in the form of corresponding velocities and these energies are translated into voltage pulses of corresponding magnitudes by the time of flight to voltage converter 24. Reaction products having energies falling within a selected band of energies are segregated from the remaining reaction products by the pulse height selection characteristics of the single channel analyzer 26. The single channel analyzer is provided with adjustments such that pulses falling within a band of selected minimum and selected maximum heights are admitted. The single channel analyzer provides output pulses of uniform height for the input pulses accepted within the selected band. These output pulses are utilized to turn on gate 28 which is in the input circuit of multi-channel analyzer 30. The energy of the reaction products which originate the gating pulses are identified more precisely with respect to energy within the selected energy band by the function sampler 32. This device is coupled to both the nuclear detector and to the modulation oscillator. Each pulse from nuclear reaction detector is converted in the function sampler into a pulse having an amplitude corresponding to the instantaneous target potential which existed at the instant of the particular reaction. The output of the function sampler is therefore a sequence of pulses of magnitude corresponding to the respective particle accelerating potentials. The output pulses from the function sampler are admitted through gate 28 to the multi-channel analyzer when they fall within the energy band selected by the single channel analyzer 26.

Techniques for time of flight measurements are now well known in the art and are described in the National Nuclear Energy Series, vol. 3, pages 246–251, published by McGraw-Hill Co., New York, and also in Electronic Engineering, 24, 289 (1952) by N. F. Moody.

Figure 2:
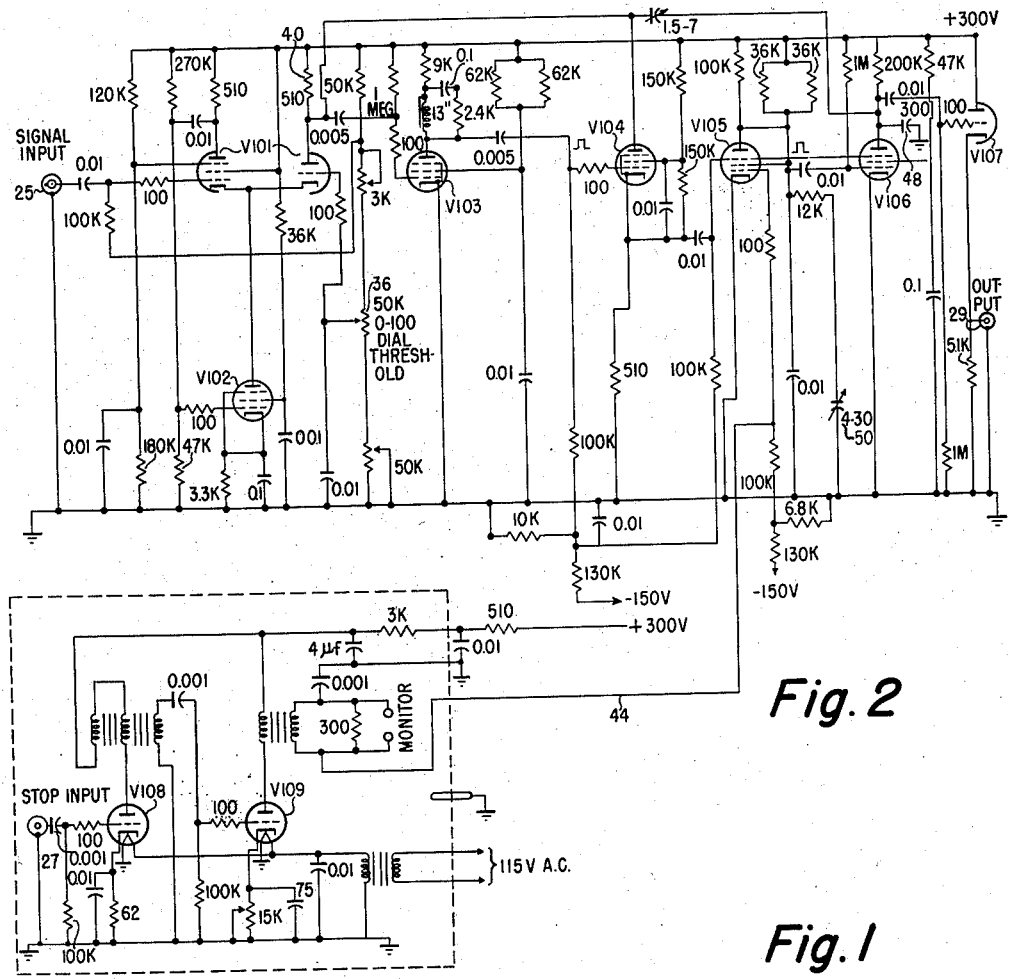
Figure 2 is a schematic diagram of the time-to-voltage converter.

A preferred embodiment of a time of flight to voltage converter is shown in Figure 2, the details of which are not a part of the present invention. The circuit incorporates a pulse amplitude discriminator which is essential if the system is to work reliably when the source of irregular shape pulses, i.e., the signals from the neutron detector cover a continuum of pulse heights down to noise. The discriminator portion of the system includes tubes V–101, V–102, V–103 and V–104. Tubes V–101 and V–102 constitute the well-known "long tailed path." Normally, the pentode section of V–101 is conducting and the triode is cut off with a bias determined by a threshold potentiometer 36. When the negative input pulse from the nuclear detector is of sufficient amplitude, the common cathode voltage of the pentode and triode sections of V–101 drops until the triode section conducts, giving a negative pulse at the plate of the latter which triggers the pulse forming portion V–103 and V–104 of the discriminator. Tube V–103 is provided with zero bias and its plate load includes a shorted section of delay line. It follows that when V–103 is suddenly cut off and held cut off, the positive pulse at the plate can be no longer than the "down and back" time of the delay line. This positive pulse is applied to cathode follower V–104 which is normally biased to cut-off. The discriminator output pulse is obtained from the cathode of load resistor of V–104.

A common plate resistor 40 is shared by V–104 and the triode section of V–101. The purpose of this circuitry is that, if an input pulse to the discriminator is shorter than the desired duration for the output pulse, the current in V–104 causes a negative pulse at the grid of V–103 when the pulse-forming portion of the circuit is triggered and this keeps V–103 biased to cut-off until the end of the normal output pulse, which will therefore always have the same duration regardless of the duration of the triggered pulse.

The time of flight to voltage conversion portion of the circuit utilizes tubes V–105 and V–106. A stop pulse, related in time to the instant the particle beam traverses the target, is utilized to terminate each pulse generated by the discriminator. The stop pulse is initiated by the deflection oscillator and is amplified and shaped in the circuitry utilizing tubes V–108 and V–109. Tube V–108 is transformer coupled to V–109 to provide output pulses of positive polarity and 100 volts magnitude.

The output of tube V–109 is coupled through connection 44 to the control grid of V–105. These stop pulses cause pulses of cathode current in V–105 due to grid rectification but no plate current flow. The occurrences of a positive pulse from tube V–104 applied to the suppressor grid of tube V–105 and also to the No. 3 grid of V–106, causes a saturation plate current flow in V–106 and causes the potential across capacitor 48 connected to the anode of V–106 to drop linearly with time. The discriminator output pulse is terminated by the next stop pulse injected on the control grid of V–105. The coincidence of the discriminator output pulse and the stop pulse causes the generation of a negative pulse at the plate of V–105. This pulse is coupled to the No. 1 grid of V–106 which open-circuits tube V–106 and stops the linear discharging of the plate capacitor 48. The output pulse from V–106 is differentiated and coupled to the input of tube V–107 which therefore generates a negative pulse on its cathode which has an amplitude corresponding to the terminal magnitude of the potential across capacitor 48. It follows that since the magnitude of the terminal potential of capacitor 48 depends upon the duration between the beginning of a discriminator input pulse and the occurrence of the input stop pulse that the output pulse from V–107 has a magnitude inversely proportional to the time of flight of interest.

Referring again to Figure 1, it is seen that the time of flight to voltage converter is coupled to a single channel analyzer 26. The output of the single channel analyzer is impressed on gate 28 connected in series with the input of the multi-channel analyzer 30. The single channel analyzer is adjusted to respond to only those times of flight of energies, i.e., reaction particles having selected energies, of interest. The modulation oscillator 14 and the function sampler 32 have been described in detail in Patent No. 2,895,051 issued July 14, 1959. However, the modulation oscillator can be any generator capable of producing a high potential cyclical wave form. A frequency of ten cycles per second has been found suitable. The multi-channel analyzer may be of any convenient embodiment and that used in this preferred embodiment is described in Nucleonics, January 1953, vol. II, No. 1, pages 36–41 by C. W. Johnstone.

As mentioned previously the reaction products of the target are created by impinging particles having energies determined by the target potential. These impinging particles generate reaction products at the target and the reaction products having energies of interest are selected by the time-to-voltage converter 24 and single channel analyzer 26. The reaction products are translated into electrical pulses having amplitudes corresponding to the particle energies and are admitted through gate 28 to the multi-channel analyzer 30. These pulses are translated into counts in the appropriate channels of the multi-channel analyzer.

The foregoing is a description of a preferred embodiment of a nuclear reaction analyzer but it is obvious that the spirit of the invention admits of other embodiments. Accordingly, it is understood that the invention is considered to be limited only by the appended claims taken in view of the prior art.

What is claimed is:
1. Apparatus for measuring the nuclear cross sections of materials comprising a nuclear target, means for periodically impinging a charged particle beam against said target, means for periodically interrupting said particle beam, a nuclear reaction detector spacedly supported in the path of the reaction products from said target, a time of flight to pulse height converter coupled to said nuclear reaction detector and to said means for periodically interrupting said beam, a multi-channel analyzer, a gating circuit connected in series with the input to said multi-channel analyzer, means for controlling said gating circuit coupled to the time of flight to pulse height converter, means for cyclicly varying the target potential at a frequency much less than the frequency of impingement of the particle beam against the target, a function sampler coupled to said means for varying said target potential and to said nuclear detector for generating a pulse in response to each detected event having an amplitude corresponding to the instantaneous target potential, means electrically coupling the output of said function sampler to the input of said gating circuit, whereby nuclear reactions are instantaneously recorded in appropriate channels of said pulse height anlyzer in accordance with each nuclear reaction energy.

2. The device of claim 1 in which said means for periodically interrupting the particle beam deflects the particle beam to and fro across a central beam path in line with the target.

3. The device of claim 1 in which said means for pulsing the particle beam is a deflection oscillator having a frequency much higher than the frequency of the means for varying the target potential, and a pair of deflection plates oppositely supported relative to the particle beam path.

References Cited in the file of this patent
UNITED STATES PATENTS
2,802,951   Seevers _____ Aug. 13, 1957
FOREIGN PATENTS
724,441   Great Britain _____ Feb. 23, 1955